US010569720B2

(12) United States Patent
Buschmann et al.

(10) Patent No.: US 10,569,720 B2
(45) Date of Patent: Feb. 25, 2020

(54) MOTOR VEHICLE CAMERA SYSTEM

(71) Applicant: HUF HUELSBECK & FUERST GMBH & CO. KG, Velbert (DE)

(72) Inventors: Gerd Buschmann, Velbert (DE); Heiko Schutz, Velbert (DE)

(73) Assignee: HUF HUELSBECK & FUERST GMBH & CO. KG, Velbert (DE)

( * ) Notice: Subject to any disclaimer, the term of this patent is extended or adjusted under 35 U.S.C. 154(b) by 129 days.

(21) Appl. No.: 15/038,896

(22) PCT Filed: Nov. 26, 2014

(86) PCT No.: PCT/EP2014/003145
§ 371 (c)(1),
(2) Date: May 24, 2016

(87) PCT Pub. No.: WO2015/078577
PCT Pub. Date: Jun. 4, 2015

(65) Prior Publication Data
US 2017/0001578 A1 Jan. 5, 2017

(30) Foreign Application Priority Data

Nov. 27, 2013 (DE) .......................... 10 2013 018 022

(51) Int. Cl.
*H04N 5/225* (2006.01)
*B60R 11/04* (2006.01)

(52) U.S. Cl.
CPC ........... *B60R 11/04* (2013.01); *H04N 5/2253* (2013.01); *H04N 5/2254* (2013.01); *H04N 5/2256* (2013.01)

(58) Field of Classification Search
CPC ........................... H04N 5/2256; H04N 5/2253
See application file for complete search history.

(56) References Cited

U.S. PATENT DOCUMENTS 4,320,949 A * 3/1982 Pagano ............... G03B 17/08
219/201
6,189,231 B1 * 2/2001 Lancer ............... A47K 10/48
34/90

(Continued)

FOREIGN PATENT DOCUMENTS

DE 102006023103 A1 11/2007
DE 102006039192 A1 2/2008

(Continued)

OTHER PUBLICATIONS

International Search Report (ISR) dated Feb. 11, 2015, for PCT/EP2014/003145.

*Primary Examiner* — William C Vaughn, Jr.
*Assistant Examiner* — Jerry T Jean Baptiste
(74) *Attorney, Agent, or Firm* — Bacon & Thomas, PLLC

(57) ABSTRACT

The invention relates to a motor vehicle camera system with an image capture unit and a drive device by means of which the image capture unit can be displaced from a standby position into at least one operating position, wherein the image capture unit is arranged in a mounting chamber of a motor vehicle and the mounting chamber has a movable closing element, wherein said closing element closes the mounting chamber if the image capture unit is in the standby position thereof, and opens the mounting chamber at least partially to the environment if the image capture unit is displaced into an operating position, wherein the closing element is at least partially transparent, and the image capture unit is aligned in the standby position thereof so that the image capture unit in the standby position thereof captures an outer region of the motor vehicle through the closing element.

13 Claims, 5 Drawing Sheets

(56) References Cited

U.S. PATENT DOCUMENTS

| | | | |
|---|---|---|---|
| 2007/0115099 A1 | 5/2007 | Hamada | |
| 2009/0231430 A1* | 9/2009 | Buschmann | B60Q 1/0023 348/148 |
| 2009/0303325 A1* | 12/2009 | Mizuno | G03B 3/10 348/143 |
| 2011/0266375 A1* | 11/2011 | Ono | B60S 1/0848 239/589 |
| 2013/0182112 A1* | 7/2013 | Liepold | B60R 11/04 348/148 |
| 2013/0209079 A1 | 8/2013 | Alexander et al. | |

FOREIGN PATENT DOCUMENTS

| | | |
|---|---|---|
| DE | 102007052402 A1 | 5/2009 |
| EP | 1332923 A2 | 8/2003 |
| FR | 2858280 A1 | 2/2005 |

* cited by examiner

MOTOR VEHICLE CAMERA SYSTEM

BACKGROUND OF THE INVENTION

The invention relates to a motor vehicle camera system with an image capture unit and a drive device by means of which the image capture unit can be displaced from a standby position into at least one operating position, wherein the image capture unit is arranged in a mounting chamber of a motor vehicle and the mounting chamber has a movable closing element, wherein said closing element closes the mounting chamber if the image capture unit is in the standby position thereof, and opens the mounting chamber at least partially to the environment if the image capture unit is displaced into an operating position.

Such a motor vehicle camera system is known from DE 10 2006 023 103 A1.

The image capture unit in such motor vehicle camera systems is displaced from the standby position into an operating position, in order to also allow such outer regions of the motor vehicle to be captured by means of the image capture unit in the operating position, which would be unable to be captured by the image capture unit in the standby position, such as a blind spot below the motor vehicle rear end when reversing the motor vehicle, for example. However, unless the image capture unit in the motor vehicle camera system is displaced into the operating position, the image capture unit is in a standby position, in which it is arranged in a mounting chamber of the motor vehicle, and therefore the optical overall impression of the motor vehicle is not disrupted by an outwardly projecting image capture unit. The image capture unit can thus be displaced into a standby position, in which the mounting chamber is closed by the closing element. If the image capture unit is displaced into the operating position, the mounting chamber is at least partially open to the environment, thus allowing the outer region of the motor vehicle to be captured by means of the image capture unit.

A disadvantage of the known motor vehicle camera systems is that the image capture unit cannot be used in the standby position thereof.

SUMMARY OF THE INVENTION

The object of the invention is to further develop a motor vehicle camera system in such a way that the motor vehicle camera system allows better usability and in particular also allows the image capture unit to be used in the standby position thereof.

According to the invention, the object is achieved by means of a motor vehicle camera system. Advantageous further developments of the invention are indicated.

Particularly advantageous in the motor vehicle camera system with an image capture unit and a drive device, by means of which the image capture unit can be displaced from a standby position into at least one operating position, wherein the image capture unit is arranged in a mounting chamber of a motor vehicle and the mounting chamber has a movable closing element, wherein the closing element closes the mounting chamber if the image capture unit is in the standby position thereof, and opens the mounting chamber at least partially to the environment if the image capture unit is displaced into an operating position, is that the closing element is at least partially transparent, and the image capture unit is aligned in the standby position thereof in such a way that the image capture unit in the standby position thereof captures an outer region of the motor vehicle through the closing element.

According to the invention it is thus provided that the closing element is at least partially transparent. Said closing element can thus have one or more transparent sectors or sections or be configured in a completely transparent manner, and therefore the light from outside can fall into the mounting chamber in which the image capture unit is arranged, and therefore an outer region of the motor vehicle can be captured through the closing element by means of the image capture unit, even if said image capture unit in the standby position thereof is in the mounting chamber of the motor vehicle. Here, the image capture unit comprises, for example, a camera. The image capture unit can furthermore have further components, such as a residual light amplifier and the like and/or filters for filtering out specific light components, for example. The image capture unit can thus in particular comprise a camera lens or a complete camera.

The mounting chamber in which the image capture unit is arranged can be arranged inside the motor vehicle, in particular form part of the vehicle body or be arranged inside the vehicle body. For example, the luggage compartment hatch, a wing, a bumper or such like of a motor vehicle can be concerned. Should the motor vehicle camera system be used as a rear-view camera of a motor vehicle, the mounting chamber is located at the rear of the motor vehicle and the image capture unit can be displaced between a standby position and at least one operating position in such a way as to allow the image capture unit in its operating position thereof to capture the outer region behind and/or below the motor vehicle.

In the standby position the image capture unit is arranged inside the mounting chamber, wherein said mounting chamber is closed by the closing element. Here, the image capture unit is designed in such a way as to allow an outer region of the motor vehicle to be captured through the closing element by means of the image capture unit in the standby position thereof, wherein the angle of vision deviates or can deviate from the angle of vision in the operating position, wherein a reduced angle of vision compared with the operating position can in particular be involved. For example, the motor vehicle camera system can thus assume the function of a rear-view mirror in the standby position of the image capture unit. The motor vehicle camera system with the image capture unit in the standby position thereof can also serve as an accident data recorder (black box) and/or as an accident warning sensor. Corresponding image evaluation units can be provided to this end, by means of which the proximity of another motor vehicle and/or an obstacle can be detected in order, for example, to tighten the seatbelts of the motor vehicle passengers and/or displace headrests into the position providing maximum protection in the event of an accident. When using the motor vehicle camera system as an accident data recorder (black box), a data storage unit can be provided, by means of which the image data captured by the image capture unit can be stored in a non-volatile or volatile manner.

The image capture unit can be displaced between a standby position and at least one operating position. Here, the term "can be displaced" includes any possible movement between the standby position and the operating position, i.e. both translational and rotational movements as well as possible combinations and aligned arrays of translational and rotational movements are included. In particular, the image capture unit can be arranged pivotally between a standby position and an operating position.

Particularly advantageous in the invention is that the image capture unit, such as a camera or a camera lens, for example, is constantly available and the motor vehicle camera system can, if necessary, thus fulfil other functions in addition to the known function as a rear-view camera, such as that of an electronic rear-view mirror, if the images of the outer region of the motor vehicle, captured by the image capture unit in the standby position thereof, are reproduced on an image reproduction device within the motor vehicle in the driver's field of vision, for example. Particularly advantageous is thus the constant availability and usability of the image capture unit in the motor vehicle camera system according to the invention.

When using the motor vehicle camera system as a rear-view camera, the displacement of the image capture unit from the standby position into the operating position also allows the capture of, for example, the region below the vehicle bumper and/or directly behind said vehicle bumper, which has not yet been captured by the image capture unit, as long as the image capture unit in the mounting chamber is in the standby position. The image capture unit is thus displaced into the operating position, whereby the outer region of the motor vehicle, which is captured by means of the image capture unit, is enlarged and/or changed compared with that outer region of the motor vehicle captured through the closing element by means of the image capture unit in the standby position thereof.

The image capture unit in the operating position can thereby be at least partially arranged outside the mounting chamber.

That means that the image capture unit in this preferred embodiment is arranged in a displaceable manner such that it at least partially protrudes from the mounting chamber in the operating position and, if necessary, is pivoted relative to the alignment in the standby position thereof, in order to enable specific regions of the outer region of the motor vehicle to be captured by means of the image capture unit.

The image capture unit in the operating position can thereby have a different relative alignment relative to the motor vehicle to that in the standby position.

This means, for example, that the image capture unit in its standby position has a horizontal alignment such that the camera system as a rear-view mirror and/or accident warning sensor and/or accident data recorder (black box) captures the traffic following behind the motor vehicle, whereas the image capture unit in the operating position thereof has an alignment at an angle $\alpha$ inclined downwards relative to the horizontal behind the vehicle, in order to capture the region immediately behind the vehicle in the operating position, if the motor vehicle camera system is used as part of a rear-view camera system of the motor vehicle. The region below the bumper is then in the angle of vision of the image capture unit in the operating position.

The closing element in a preferred embodiment is unidirectionally transparent, and therefore the light from outside penetrates into the mounting chamber and is captured by the image capture unit, wherein no or only little visible light visibly gets to the outside from the mounting chamber.

Particularly advantageous in this embodiment is the fact that the camera system can also be used as a camera system in the event of a closed closing element if the image capture unit is in the standby position thereof, wherein an outside observer cannot see into the mounting chamber, and therefore the motor vehicle design of the vehicle and the optical overall impression thereof for the observer is not affected. In this case, the closing element has the same properties as a one-way mirror or semi-transparent mirror. Here, a weakness of the human eye and all optical recording devices is drawn upon, namely that only a limited area of the existing reflectance spectrum can ever be captured, whereas other areas seem over- or underexposed, as a medium involving the stated properties is not possible according to current physical understanding. The property of unidirectional transparency thus means the described optical property on the basis of the stated weakness of the human eye and of optical recording devices.

The image capture unit can have one or more optical lenses and/or have an optical lens system. The optical lenses can be converging lenses or scattering lenses or combinations of converging lenses and/or scattering lenses. Such lenses or lens systems allow the outer region of the motor vehicle to be influenced, in particular the angle of vision to be optically captured by the image capture unit.

The image capture unit in a further preferred embodiment has a wide-angle lens or a fisheye lens. Such a wide-angle lens or fisheye lens allows a particularly large area of the outer region outside the motor vehicle to be captured by means of the image capture unit.

Moreover, the closing element per se can be configured as an optical lens or as an optical lens system. Converging lenses or scattering lenses or combinations of converging lenses and/or scattering lenses can thereby be involved, in order to correspondingly influence the observation area of the motor vehicle camera system.

The position of the image capture unit can preferably be varied within the mounting chamber by means of the drive device. This means that the image capture unit can be displaced within the mounting chamber by means of the drive device, and therefore the location of the image capture unit within the mounting chamber can be adapted to the respective requirements, in order, for example, to enlarge or reduce the observation area to be captured by means of the image capture unit in the event of a closed closing element, depending on the individual requirement and scope of application of the motor vehicle camera system. In the event of a closed closing element, if the latter is used, for example, as an accident warning sensor for early detection of the risk of accident, varying the position of the image capture unit within the mounting chamber, in particular in the event of the arrangement of one or more optical lenses or of an optical lens system, allows the observation area, which is captured through the closed closing element by means of the image capture unit, to be varied, and therefore also allows said observation area to be adjusted, for example, to the driving speed of the motor vehicle. It is thus, for example, advantageous in the event of lower driving speeds in urban areas if a wider close-range behind the vehicle is observed, whereas it is advantageous in the event of higher driving speeds, as driven on the freeway, if a narrower range behind the vehicle is observed, i.e. a range with a narrower angle of vision, but with a larger observation depth behind the vehicle.

The image capture unit is preferably connected with a computing unit for evaluating and/or transmitting image data and/or with an image reproduction device in the motor vehicle.

Such a computing unit for evaluating and/or transmitting image data allows an evaluation of the image data determined by means of the image capture unit, and therefore allows a direct risk of accident to be detected by means of the motor vehicle camera system in the event of any approach of a motor vehicle and/or obstacle, in order, for example, to tighten the seatbelts and/or displace the vehicle seats and in particular the headrests into a position that offers the vehicle passengers the greatest possible protection before a collision. Moreover, such a computing unit also allows a conversion of image data of a wide-angle lens or of a fisheye lens into a better representation for the motor vehicle driver if the image data are reproduced on an image reproduction device in the motor vehicle. A monitor is thereby arranged in the motor vehicle, said monitor being used to reproduce the image data of the motor vehicle camera system.

The closing element in a preferred embodiment is in particular an emblem of in particular a motor vehicle manufacturer. The closing element can also be designed as a decorative element.

This allows an optically advantageous integration of the closing element in the motor vehicle body.

The closing element can at least form part of the vehicle license plate and/or at least form part of a lamp unit of the motor vehicle. The outer cover of the lamp unit or part of the reflector of a lamp unit of the motor vehicle can thereby be involved. For example, the closing element can at least form part of a third brake light at the rear of the motor vehicle.

The closing element in a preferred embodiment is formed by a handling element for actuating a door and/or hatch of the motor vehicle.

Such a handling element can be grasped by a user, in order, for example, to open a door or hatch of the motor vehicle, such as the luggage compartment hatch, for example. To this end, the handling element is displaced from a first position corresponding to a standby position into an actuating position by the user, in order to open the door or hatch. The actuating position of the handling element for opening the door or hatch can thereby correspond to that position into which the closing element is displaced if the image capture unit is displaced into an operating position, or can alternatively assume a deviating position hereto. Alternatively or cumulatively, such closing element designed as a handling element for opening a door or hatch can be simultaneously configured as an emblem, in particular of a motor vehicle manufacturer.

BRIEF DESCRIPTION OF THE DRAWINGS

Two exemplary embodiments of the invention are shown in the figures and are explained in more detail in the following. The figures show in.

Identical components in the illustrations are indicated with identical reference numerals.

DETAILED DESCRIPTION OF THE INVENTION

Figure 1:
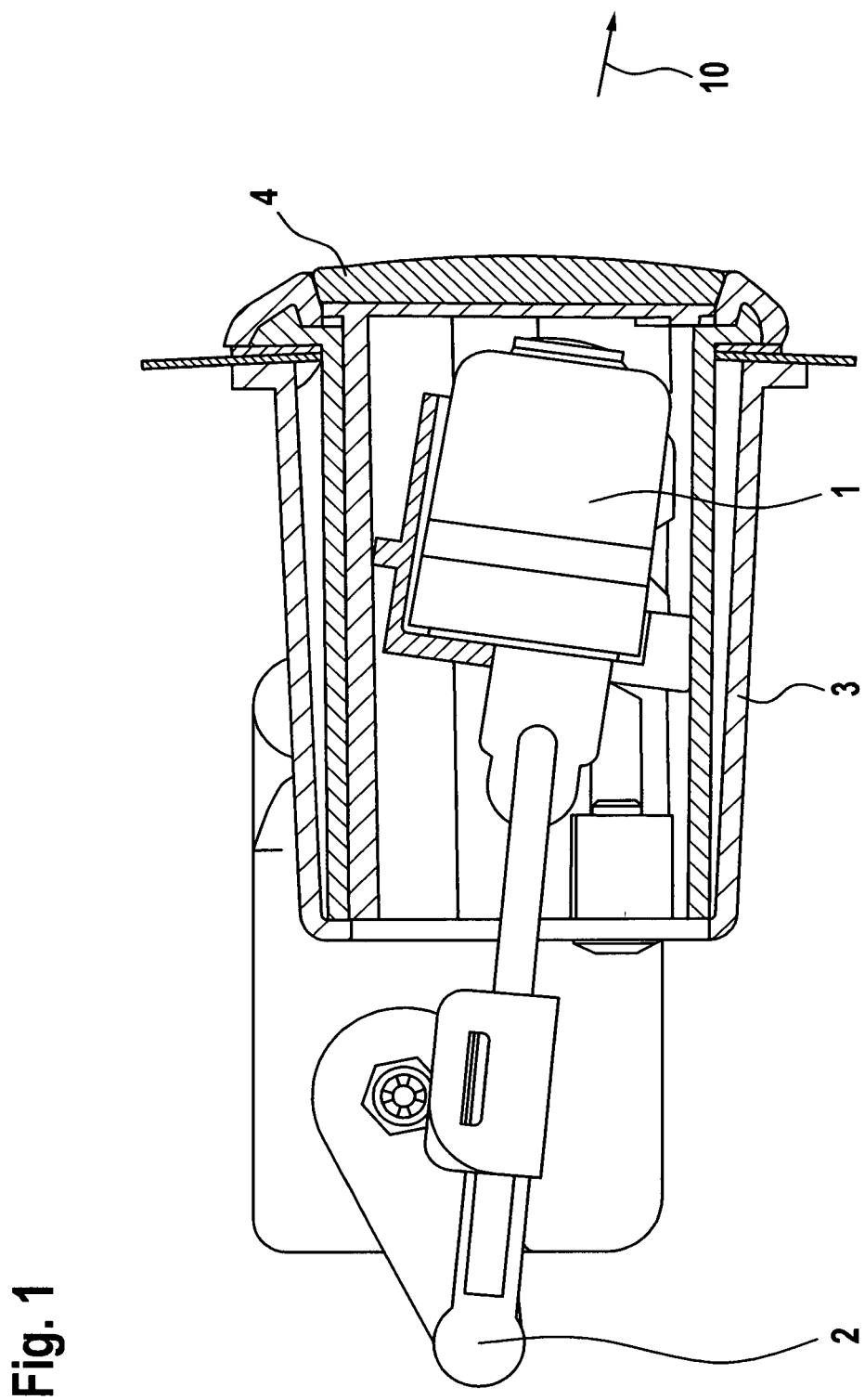
FIG. 1 a sectional view of the mounting chamber with the image capture unit arranged therein in the standby position of a first exemplary embodiment.
Figure 2:
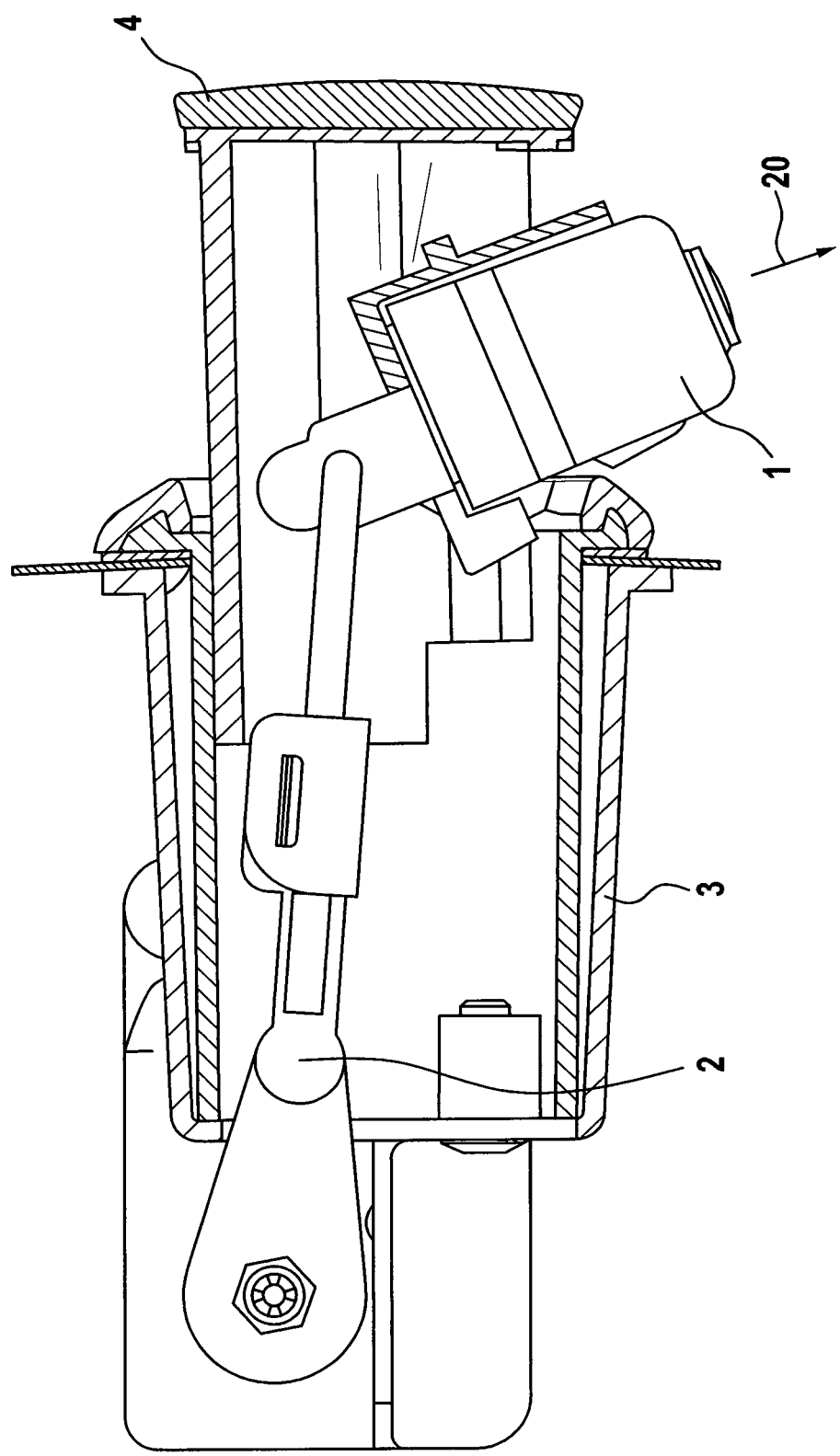
FIG. 2 a sectional view of the mounting chamber with the image capture unit in the operating position of the exemplary embodiment according to FIG. 1.

FIGS. 1 and 2 show sectional views of a motor vehicle camera system, wherein the image capture unit 1 in the illustration according to FIG. 1 is in the standby position of said image capture unit within the mounting chamber 3, whereas the image capture unit 1 in the illustration according to FIG. 2 has been displaced in its operating position.

The image capture unit 1 in the form of a camera is arranged within the mounting chamber 3 in a displaceable manner. Said mounting chamber 3 is formed by a housing, which accommodates the image capture unit 1. The displacement of the image capture unit 1 is effected from the standby position shown in FIG. 1 into the operating position shown in FIG. 2 by means of the drive device 2, which comprises multiple levers and joints.

The image capture unit 1 is displaced from the standby position according to FIG. 1 into the operating position according to FIG. 2 via a combination of translational and rotational movements, and therefore the image capture unit 1 in the operating position 2 has been transitionally driven out of the mounting chamber 3 in the form of the housing and has also been pivoted around a fulcrum, and therefore the line of vision of the image capture unit 1 in the operating position according to FIG. 2 is different to that in the standby position according to FIG. 1.

The line of vision of the image capture unit 1 is illustrated by the arrow 10, which characterizes the line of vision in the standby position according to FIG. 1, and also by the arrow 20 according to FIG. 2, which characterizes the line of vision of the image capture unit 1 in the operating position according to FIG. 2. The line of vision equally designates the center line of the optical coverage range of the image capture unit 1.

In the standby position according to FIG. 1, in which the image capture unit 1 is located completely within the mounting chamber 3, said mounting chamber 3 is closed against the environment by the closing element 4. In order to allow the displacement of the image capture unit 1 from the standby position according to FIG. 1 into the operating position according to FIG. 2 by means of the drive device, the closing element 4 is displaced outwards, as evident in FIG. 2, and therefore the mounting chamber 3 is partially open to the environment and the image capture unit 1 can be displaced into the operating position according to FIG. 2, in which it is further pivoted after a translational displacement, and therefore the image capture unit 1 in the operating position according to FIG. 2 has a different line of vision according to the arrow 20 to that in the standby position according to FIG. 1.

The closing element 4 in the closed position according to FIG. 1 prevents the penetration of dirt into the mounting chamber 3, thus also preventing any contamination of the image capture unit 1.

The closing element 4 is transparent, thus allowing the image capture unit 1 in the standby position thereof according to FIG. 1 to capture the outer region behind the non-illustrated motor vehicle though the closing element 4. Here, the line of vision is indicated by the arrow 10.

In the standby position according to FIG. 1 the traffic following behind the motor vehicle can thus be captured through the closing element 4 by means of the image capture unit 1, and therefore the camera system can be used as an electronic rear-view mirror, in that the images captured by means of the image capture unit 1 are displayed on a monitor in the motor vehicle interior.

The camera system can also be used as an accident warning sensor, in that an electronic image evaluation of the images of the region behind the motor vehicle captured by means of the image capture unit 1 is implemented by means of an evaluation unit, in order to, for example, detect an undue proximity of another motor vehicle. If such an undue proximity of another motor vehicle and/or of an obstacle is detected, corresponding measures can be taken within the motor vehicle, such as, for example, tightening the seatbelts and/or adjusting the seats and in particular the headrests into a position offering the motor vehicle passengers maximum protection.

In the operating position according to FIG. 2 the image capture unit 1 is displaced into a position in which it partially protrudes from the mounting chamber 3 and has an angle of vision in deviation to that of the standby position according to FIG. 1. Accordingly, a different region behind the motor vehicle can be captured in the operating position according to FIG. 2. The angle of vision of the image capture unit 1 in the operating position 1 is indicated by the arrow 20 according to FIG. 2. The image capture unit 1 is aligned in such a way as to allow the region below and immediately behind the motor vehicle bumper to be captured by means of the image capture unit 1, and therefore the camera system can be used as a rear-view camera for the motor vehicle driver, in that the images of the region immediately behind and below the motor vehicle captured by means of the image capture unit 1 are displayed on a monitor in the motor vehicle interior.

The drive device in the exemplary embodiment shown is formed by a lever system, which allows a translational and a rotational movement of the image capture unit. Alternatively, threaded rods, toothed rods and the like can be used as a drive device.

The closing element 4 in the exemplary embodiment shown is arranged in such a way that said closing element is displaced from the standby position according to FIG. 1 into the operating position according to FIG. 2 by a translational movement. Another possible alternative is that the closing element is arranged in a manner that can be pivoted around a fulcrum.

The closing element 4 in the exemplary embodiment illustrated is the emblem of a motor vehicle manufacturer. Accordingly, the entire arrangement according to FIGS. 1 and 2 can be integrated in the motor vehicle body in an optically particularly advantageous manner. The lighting properties of the closing element 4 are thereby selected in such a way as to allow light from outside to fall into the mounting chamber 3, thus allowing the region outside to be captured through the closing element by means of the image capture unit 1. However, there is no possibility for an outside observer to see into the mounting chamber 3 from outside though the closing element 4, thus resulting in an overall particularly advantageous optical design of the motor vehicle.

Figure 3:
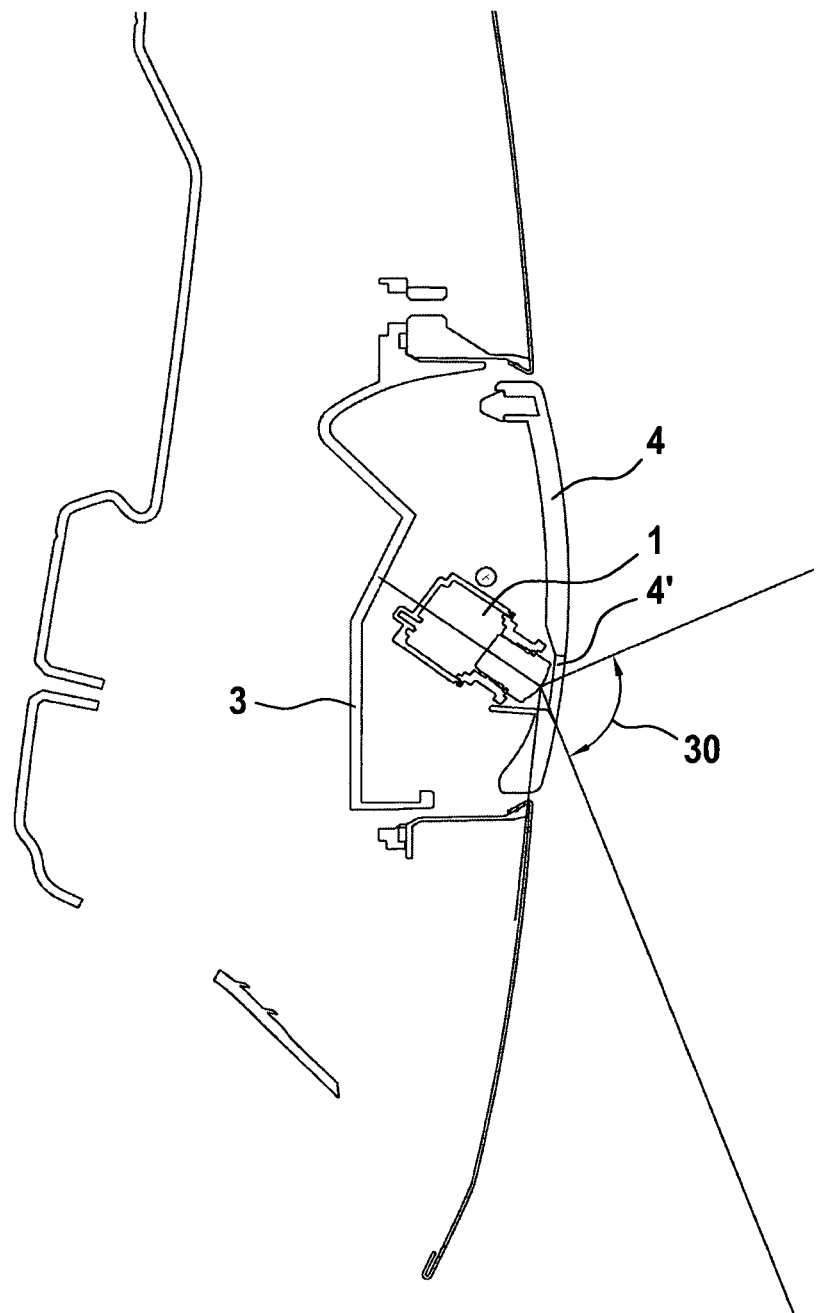
FIG. 3 a sectional view of the mounting chamber with the image capture unit arranged therein in the standby position of a second exemplary embodiment.
Figure 4:
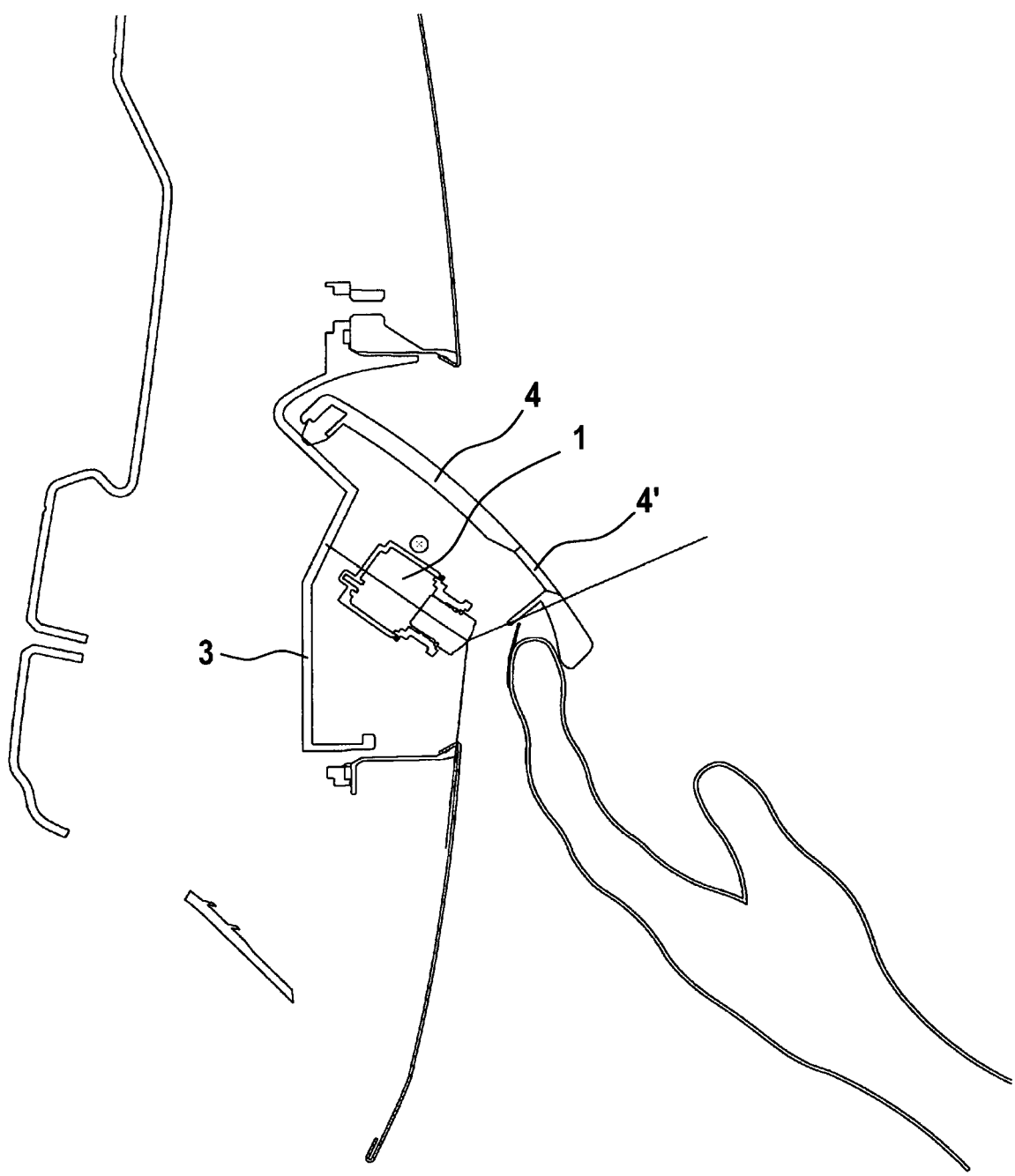
FIG. 4 a sectional view of the mounting chamber with the image capture unit arranged therein in the standby position of the second exemplary embodiment according to FIG. 3 in the event of manual actuation of the closing element configured as a handling element.
Figure 5:
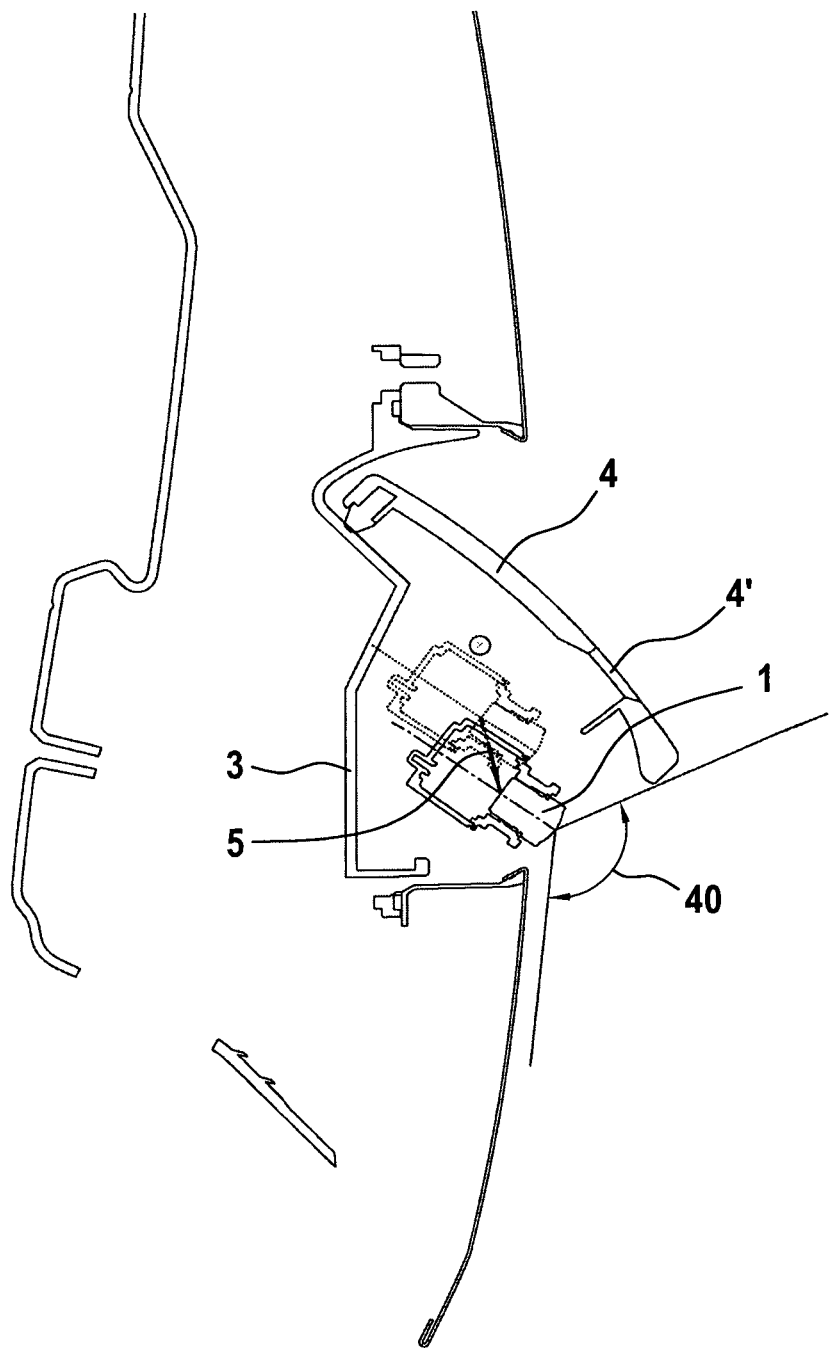
FIG. 5 a sectional view of the mounting chamber with the image capture unit in the operating position of the second exemplary embodiment.

FIGS. 3-5 show sectional views of the mounting chamber 3 with image capture unit 1 of a second embodiment arranged therein in various operating situations. Identical components are in turn indicated with identical reference numerals.

FIG. 3 shows the sectional view of the mounting chamber 3 with the image capture unit 1 arranged therein in the standby position, which is assumed when the vehicle comes to a standstill or is in forward motion. The section illustrated in FIG. 3-5 shows an arrangement of the installation area 3 with the image capture unit 1 arranged therein at the rear of the vehicle.

Accordingly, the direction of travel in the event of forward motion on the image plane according to FIG. 3-5 is directed towards the left, whereas the direction of travel in reverse motion on the image plane according to FIG. 3-5 is directed towards the right.

In the standby position of the image capture unit 1 according to FIG. 3 the image capture unit 1 within the installation area 3 is covered relative to the environment and protected against environmental impacts by the closing element 4.

The closing element 4 has a transparent region 4, via which the region behind the motor vehicle corresponding to the angle of vision 30 shown according to FIG. 3 can be captured by means of the image capture unit 1 in the standby position.

The image of the environment of the rearward view of the motor vehicle, which is captured by means of the image capture unit 1 and corresponds to the angle of vision 30 shown in FIG. 3, can be displayed in real time on an image reproduction unit within the vehicle for the vehicle driver.

The closing element 4 simultaneously forms a handling element for manually opening the luggage compartment hatch of the motor vehicle. To this end, the cover 4 designed as a handling element can be grasped and actuated by a user for opening the luggage compartment hatch, as shown in FIG. 4. To this end, the user grips underneath the lower edge of the closing element 4, serving as a handling element for manually opening the luggage compartment hatch of the motor vehicle, and pivots said handling element from the standby position according to FIG. 3 into the actuation position according to FIG. 4. The displacement into the actuation position 4 causes the lock of the luggage compartment hatch to open via a kinematic coupling of the handling element 4 (not shown in the illustrations), unless said luggage compartment hatch is locked. This allows the luggage compartment hatch to be opened by the user by the manual actuation, as shown in FIG. 4, by means of the closing element 4 designed as a handling element for actuating the luggage compartment hatch. The image capture unit 1 thereby remains in its standby position, which corresponds to the position according to FIG. 3 when the vehicle has come to a standstill or is in forward motion.

FIG. 5 shows the positioning of the image capture unit 1 and closing element 4 during reverse motion of the vehicle. When the reverse gear is engaged, the closing element 4 is automatically displaced into the opening position according to FIG. 5 by means of an electromotive drive. Moreover, the image capture unit 1 is displaced along a linear displacement path shown by the arrow 5 within the mounting chamber 3 from the standby position corresponding to FIG. 3, shown as a dashed line in FIG. 5, into the operating position illustrated in FIG. 5. The displacement path according to the arrow 5 is a purely translational movement. The fact that the closing element 4 is simultaneously displaced into the opening position shown in FIG. 5 allows the angle of vision 40 along the vehicle rear to be captured vertically downwards as well as below the closing element 4 by means of the image capture unit 1 during reverse motion of the vehicle. Accordingly, the angle of vision 40 in the event of reverse motion and open closing element 4 as well as the image capture unit 1 displaced into the operating position according to FIG. 5 is perceptibly enlarged compared with the angle of vision 30, which is captured by means of the image capture unit 1 through the transparent region 4 of the closing element 4 in the standby position according to FIG. 3.

Particularly advantageous in this second exemplary embodiment is the fact that, during the forward motion of the motion in the position according to FIG. 3, the angle of vision 30 behind the vehicle can be captured through the transparent region 4 of the closing element 4 by means of the image capture unit 1. Moreover, the displacement of the image capture unit 1 into the operating position according to FIG. 5 and the opening of the closing element 4, as shown in FIG. 5, allows an enlarged angle of vision 40 to be captured during reverse motion by means of the image capture unit 1, and therefore also allows obstacles directly behind the vehicle to be recognized. Particularly advantageous thereby is the fact that the closing element 4 in the second exemplary embodiment according to FIG. 3-5 is simultaneously configured as a handling element for manually actuating and opening the luggage compartment hatch of the vehicle.

The invention claimed is:

1. A motor vehicle camera system with an image capture unit and a drive device by means of which the image capture unit is able to be displaced from a standby position into at least one operating position,
   wherein the image capture unit is arranged in a mounting chamber of a motor vehicle and the mounting chamber has a movable closing element,
   wherein said closing element closes the mounting chamber when the image capture unit is in the standby position thereof, and opens the mounting chamber at least partially to the environment when the image capture unit is displaced into an operating position,
   wherein the closing element is uni-directionally transparent, and the image capture unit is aligned in the standby position thereof in such a way that the image capture unit in the standby position thereof is configured to capture images of an outer region of the motor vehicle through the closing element in a first line of vision and in the operating position configured to capture images of a different outer region of the motor vehicle in a second line of vision,
   wherein the uni-directionally transparent closing element is configured so that light from outside penetrates into the mounting chamber and is captured by the image capture unit, and wherein no light visibly gets to the outside from the mounting chamber, and
   wherein the closing element is formed by a handling element for actuating at least one of a door and hatch of the motor vehicle.

2. The system according to claim 1, wherein the image capture unit in the operating position is at least partially arranged outside the mounting chamber.

3. The system according to claim 1, wherein the image capture unit in the operating position has a different relative alignment relative to the motor vehicle to that in the standby position.

4. The system according to claim 1, wherein the image capture unit has at least one of one or more optical lenses and an optical lens system.

5. The system according to claim 1, wherein the image capture unit has a wide-angle lens or a fisheye lens.

6. The system according to claim 1, wherein the closing element is designed as an optical lens or as an optical lens system.

7. The system according to claim 1, wherein the position of the image capture unit within the mounting chamber can be varied by means of a drive device.

8. The system according to claim 1, wherein the image capture unit is connected with at least one of a computing unit for evaluating or transmitting image data or combination thereof and an image reproduction device in the motor vehicle.

9. The system according to claim 1, wherein the closing element is configured as at least one of an emblem and a decorative element.

10. The system according to claim 1, wherein the closing element at least forms part of a vehicle license plate.

11. The system according to claim 1, wherein the closing element at least forms part of a lighting unit of the motor vehicle.

12. The system according to claim 1, wherein the image capture unit is in the standby position when the motor vehicle is at a standstill or is in a forward motion and in the at least one operating position when the motor vehicle is in a reverse motion.

13. A motor vehicle camera system comprising an image capture unit, and a drive whereby the image capture unit is able to be displaced from a standby position into at least one operating position,
   wherein the image capture unit is arranged in a mounting chamber of a motor vehicle and the mounting chamber has a movable closing element,
   wherein said closing element closes the mounting chamber when the image capture unit is in the standby position thereof, and opens the mounting chamber at least partially to the environment when the image capture unit is displaced into an operating position,
   wherein the closing element is uni-directionally transparent, and the image capture unit is aligned in the standby position thereof in such a way that the image capture unit in the standby position thereof is configured to capture images of an outer region of the motor vehicle through the closing element in a first line of vision and in the operating position configured to capture images of a different outer region of the motor vehicle in a second line of vision,
   wherein the uni-directionally transparent closing element is configured so that light from outside penetrates into the mounting chamber and is captured by the image capture unit, and wherein no light visibly gets to the outside from the mounting chamber, and
   wherein the closing element is formed by a handling element for actuating at least one of a door and hatch of the motor vehicle.

* * * * *